March 19, 1968 A. J. TAVENDALE 3,374,124

METHOD OF MAKING LITHIUM-DRIFT DIODES BY DIFFUSION

Filed Jan. 7, 1965

INVENTOR
ALISTER J. TAVENDALE
BY
PATENT AGENT

United States Patent Office 3,374,124

Patented Mar. 19, 1968

3,374,124

METHOD OF MAKING LITHIUM-DRIFT DIODES BY DIFFUSION

Alister J. Tavendale, Deep River, Ontario, Canada, assignor to Atomic Energy of Canada Limited, Ottawa, Ontario, Canada, a corporation Filed Jan. 7, 1965, Ser. No. 424,099
4 Claims. (Cl. 148—186)

ABSTRACT OF THE DISCLOSURE

A rapid method of producing large volume lithium-drift diodes by diffusing lithium onto all but the end surfaces of a loaf or cylindrical shaped crystal of p-type material, drifting the lithium to form an intrinsic layer by the application of heat and a reverse bias voltage such that drifting takes place inwardly leaving only a small core of p-type material in the central region of the crystal.

This invention relates to a method of producing large volume lithium-drifted diodes.

Germanium and silicon p-i-n lithium-drift diode spectrometers are normally made from high purity, p-type, single crystal material. Lithium is evaporated under vacuum onto one surface of a heated, prepared crystal and temperature control is exercised so that the initial diffusion of lithium is to a depth of about 0.5 mm. This gives a diode structure which is mounted with contacts pressed against opposite faces. A reverse voltage bias is applied across the crystal under carefully controlled temperature conditions. Lithium ions (donors) drift through the crystal in the electric field and compensate for acceptor impurities present in the basic p-type material thus forming an intrinsic region. The depth of drift depends on the temperature, bias voltage, and drift time. One method of controlling temperature is by drifting in air with the crystal clamped directly to a large, temperature controlled heat sink. Another method is to heat the crystal in a suitable boiling liquid as described and claimed in Canadian patent application No. 901,673 filed Apr. 30, 1964 now Canadian Patent No. 752,583, issued Feb. 7, 1967.

In these devices the intrinsic region is the sensitive region for the detection and energy measurement of charged particles and X-ray and gamma-ray photons. It follows from this that the intrinsic region should be as large as possible for an effective device. One of the problems involved with the production of lithium-drifted diode detectors is the very long time required to produce a compensated (intrinsic) layer of only a few millimeters thickness.

The sensitive volume of a lithium-drifted diode can be increased by increasing either the area, the drifted depth, or both. An increase in area demands as starting material a crystal of large cross-section with minimum imperfections. For example, crystals of 8.5 cm.$^2$ have been used. As the cross-section increases, so does the probability of imperfections detrimental to detector performance. An increase in depth of drift requires a large increase in drift time as mentioned above. Other things being equal, drift depth is proportional to $t^{1/2}$. For example, if 1 cm. can be drifted in one month, 2 cm. requires 4 months. Experience, however, has shown that at drift depths of near 1 cm., loss of resolution due to trapping is noticeable. Operating voltages greater than 1 kv. are necessary to keep collection times acceptably short to reduce trapping effects.

It is an object of the present invention to provide a method of producing large volume lithium-drifted diode detectors with available crystals and with reasonable drift times.

This and other objects of the invention are achieved by diffusing lithium onto the entire side surfaces of a crystal, applying a bias voltage between these said surfaces and an electric contact placed centrally of an end surface not diffused with lithium, and heating in a controlled atmosphere such that drifting takes place inwardly from the side surfaces leaving a coaxial core of p-material of small size in the central region.

In drawings which illustrate embodiments of the invention:

Figure 1:
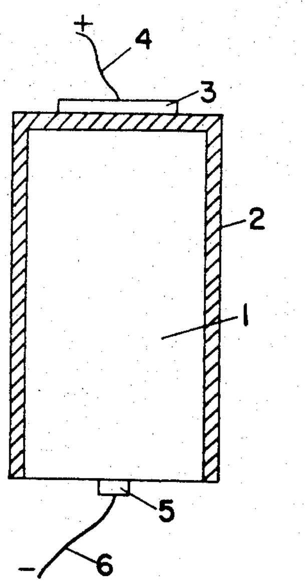
FIGURE 1 is a cross-section of a crystal prior to drifting.
Figure 2:
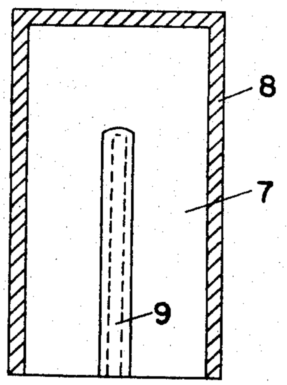
FIGURE 2 is a cross-section of a crystal after drifting.

Referring to FIGURE 1 a crystal of p-type material is shown generally as 1. A thin layer 2 of lithium (n-layer) is diffused onto all but one surface of the crystal block. A first electrical contact 3 is pressed against the layer 2 and a second contact 5 is positioned centrally of the end of the block which has not been diffused with lithium. A suitable voltage bias is applied between contacts 3 and 5 via leads 4 and 6. The assembly is then heated in controlled atmosphere either in air with the necessary heat sinks or in a liquid as disclosed in the aforementioned Canadian application No. 901,673. Drifting takes place inwardly from the lithium diffused surfaces 2. If drift time is sufficiently long an intrinsic region 7 is formed leaving a central co-axial core of p-material 9 as shown in FIGURE 2.

In some applications, a core of insensitive p-material in the centre may be undesirable. This core may be almost completely removed by drilling, machining or chemical etching, as indicated by the dotted lines in FIG. 2, without detriment to the operation of the device. Alternately, the entire core plus a little of the intrinsic layer may be removed and a very thin p+ contact made to the exposed intrinsic surface by alloying an evaporated film of a metal such as aluminum. The manner of making such contacts is well known to those skilled in the art.

Figure 3:
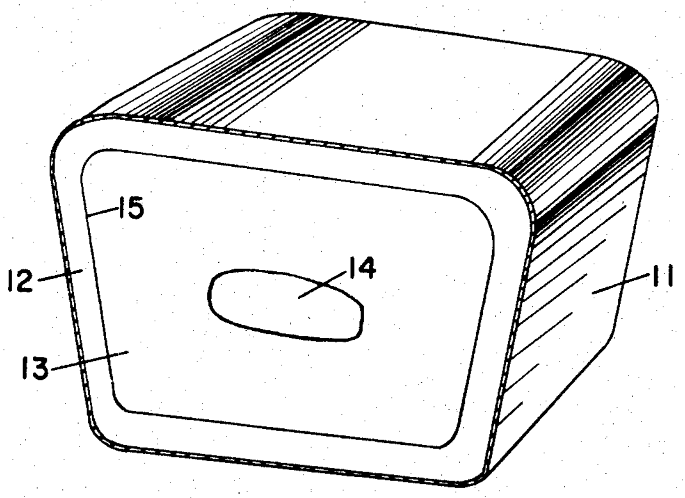
FIGURE 3 is a view of a crystal after drifting has taken place for a period of time.

FIGURE 3 shows a crystal (which is normally loaf-shaped although cylindrical shaped crystals may be employed) after drifting has proceeded to some extent. The outer, lithium diffused surface 11 has been connected to the positive contact. The negative terminal has been connected to a contact on the area 14. The area 12 is the intrinsic layer formed during the drift and the area 13 is the original p-type material. As drifting proceeds further, the line 15 which marks the boundary between the intrinsic and basic p-type material, contracts and approaches the area 14.

With the method described a much larger volume intrinsic region can be obtained than by drifting from one surface straight across the crystal. Lithium drifted detectors of this form may have many wide applications.

In the above description the device has been shown with all the surfaces but one of the crystal blocks having a diffused layer of lithium formed on them and drifting taking place inwardly from these surfaces. If desired, two opposing end surfaces might be left, with electrical contacts positioned centrally of these surfaces. These contacts would be connected together and to the negative side of the voltage bias source. In this case, after drifting a central tube of p-material extending through the crystal would be left. A device in this form might have some advantages in use for certain applications.

What is claimed is:

1. A method of producing large volume lithium-drift diodes comprising:

(a) diffusing lithium onto all surfaces except one of a crystal of p-type material, (b) applying a reverse bias voltage between these said surfaces and an electrical contact placed centrally of the surface not diffused with lithium, (c) heating in a controlled atmosphere such that drifting takes place inwardly from the said surfaces on which lithium has been diffused leaving a core of p-type material of small size in the central region, and (d) forming a $p^+$ contact on the surface of the p-type material after drifting has been completed.

2. A method of producing large volume lithium-drift diodes comprising:

(a) diffusing lithium onto all surfaces except one of a crystal of p-type material, (b) applying a reverse bias voltage between these said surfaces and an electrical contact placed centrally of the surface not diffused with lithium, (c) heating in a controlled atmosphere such that drifting takes place inwardly from the said surfaces on which lithium has been diffused leaving a core of p-type material of small size in the central region, (d) removing substantially all of the said p-type material after drifting has been completed, and (e) forming a $p^+$ contact on the crystal.

3. A method of producing large volume lithium-drift diodes comprising:

(a) diffusing lithium onto all surfaces of a crystal of p-type material except two opposing end surfaces, (b) applying a reverse bias voltage between the said surfaces and an electrical contact placed centrally of an end surface not diffused with lithium, (c) heating in controlled atmosphere such that drifting takes place inwardly from the said surfaces on which lithium has been diffused leaving a core of p-type material of small size in the central region, (d) removing substantially all of the said p-type material after drifting has been completed, and (e) forming a $p^+$ contact on the crystal.

4. A method of producing large volume lithium-drift diodes as in claim 1 wherein the starting crystal is cylindrical in shape and the lithium is diffused on all surfaces of the crystal except one end surface.

References Cited

UNITED STATES PATENTS

| | | | |
|---|---|---|---|
| 2,836,523 | 5/1958 | Fuller | 148—188 X |
| 2,908,871 | 10/1959 | McKay | 148—188 X |
| 2,958,022 | 10/1960 | Pell | 148—188 X |
| 3,104,991 | 9/1963 | MacDonald | 148—188 X |
| 3,225,198 | 12/1965 | Mayer | 148—188 X |

HYLAND BIZOT, *Primary Examiner.*